United States Patent [19]

Kunert

[11] Patent Number: 5,837,305

[45] Date of Patent: Nov. 17, 1998

[54] PROCESS FOR MAKING BACON BITS

[75] Inventor: Gale F. Kunert, Austin, Minn.

[73] Assignee: Hormel Foods Corporation, Austin, Minn.

[21] Appl. No.: 864,777

[22] Filed: May 29, 1997

[51] Int. Cl.⁶ .................. A23L 1/01; A23L 1/31
[52] U.S. Cl. .......... 426/438; 426/443; 426/465; 426/473; 426/518; 426/523
[58] Field of Search ................ 426/438, 443, 426/435, 456, 464, 465, 473, 510, 511, 518, 523, 524

[56] References Cited

U.S. PATENT DOCUMENTS

| | | | |
|---|---|---|---|
| 3,997,672 | 12/1976 | Stead et al. | 426/646 X |
| 4,218,492 | 8/1980 | Stead et al. | 426/646 |
| 4,552,768 | 11/1985 | Olander | 426/480 |
| 5,132,126 | 7/1992 | Sinkler et al. | 426/438 X |
| 5,520,944 | 5/1996 | Richardson et al. | 426/438 |
| 5,567,460 | 10/1996 | Afman | 426/264 |
| 5,637,342 | 6/1997 | Brooks et al. | 426/523 |

*Primary Examiner*—Milton Cano
*Attorney, Agent, or Firm*—Mau & Krull, P.A.

[57] ABSTRACT

A method of making bacon bits from bacon or bacon ends and pieces. Bacon or bacon ends and pieces are reduced to a first size, cooked sufficiently to bring its water activity level to a first level, wherein the bacon or bacon ends and pieces have a pink color after cooking. Then, the bacon or bacon ends and pieces are fried to bring their water activity level to a second level, wherein the bacon or bacon ends and pieces have a dark red color.

13 Claims, No Drawings

PROCESS FOR MAKING BACON BITS

BACKGROUND OF THE INVENTION

1. Fields of the Invention

This invention relates generally to a process for making bacon bits from bacon and more particularly to a process for making bacon bits comprising cooking the bacon to a first water activity level and then frying the bacon to bring it to a second, lower water activity level.

2. Description of the Prior Art

Bacon bits are used to garnish a variety of foods such as potatoes, salads, and vegetables. In addition, bacon bits may also be used as an ingredient in various food dishes such as egg dishes and sauces. Imitation bacon bits may be made from vegetable protein to resemble the cooked bacon. Real bacon bits are typically made either from grinding raw bacon and cooking it or cooking the bacon, then chilling the bacon and passing the bacon through a grinder or dicer.

It is the goal of any process for making bacon bits to have the bacon bits appear as true pieces of bacon and not ground clumps of bacon. Further, it is also desirable that the bacon bits have a uniform appearance and a dark red color.

Examples of a bacon finishing method are found in U.S. Pat. No. 4,552,768. It is also known to prepare bacon bits by taking bacon ends and pieces, which remain from other processes, and grinding them through a ⅜ inch diameter plate into a jacketed steam kettle. Then, the temperature is raised to 220° F. and is cooked under vacuum to a water activity level of approximately 0.75. The oil is then drained from the bacon ends and pieces. The oil is then further removed by pressing the bacon ends and pieces. Finally, the bacon ends and pieces are chilled and packaged.

While such a process produces very acceptable bacon bits, there is still sometimes a problem with obtaining the desired color, which is a dark red color. Still further, it is always desirable to produce a product with better texture, that is being crisper and more brittle, but not too hard.

The present invention addresses the problems associated with the prior art and provides for a new and improved process to make bacon bits.

SUMMARY OF THE INVENTION

The process for making bacon bits from bacon includes cooking the bacon sufficiently to bring its water activity level to a first level, wherein the bacon has a pink color. Then, the bacon is fried to bring its water activity level from the first level to a second level, wherein the bacon has a dark red color. In a preferred embodiment, the first water activity level is from 0.7 to 0.9 and preferably from 0.82 to 0.85. The second water activity level is from 0.7 to 0.8 and preferably an average from 0.72 to 0.76.

The invention also includes a process for making bacon bits from bacon ends and pieces. First, the bacon ends and pieces are sized to a first size. The bacon ends and pieces are then cooked sufficiently to bring its water activity level to a first level, wherein the bacon has a pink color. Fat, obtained from cooking the bacon ends and pieces, is then separated. The bacon ends and pieces are then continuously fried to bring its water activity level from the first level to a second level, wherein the bacon has a dark red color than at the first level. The bacon ends and pieces are then sized to a second size, the second size smaller than the first size.

DETAILED DESCRIPTION OF THE PREFERRED EMBODIMENT

The present invention is for making bacon bits using bacon ends and pieces. The bacon ends and pieces already are cured, but are only partially cooked by a heat process, well known in the art. The bacon ends and pieces are typically available as leftovers from the slicing operations when bacon is made. However, it is understood that other suitable sources of bacon may also be utilized.

The bacon ends and pieces are cut to a first size using an appropriate device such an Urschel Model M Dicer. The circular knives are set at a suitable distance such as ½ to 1 inch and the cross cut knives are set at approximately 1/8 inch. This would yield pieces of bacon that are ½ inch square to 1 inch square with a ⅛ inch thickness. However, because ends and pieces are being used, some of the bacon would necessarily be irregular and. not full size. It has been found that by dicing the ends and pieces before cooking and grinding, the final product has an appearance that looks more like sliced cooked bacon that has been cut or broken up. That is, it has an appearance of giving a sliced or chipped appearance which more resembles that of sliced bacon which has been cut or broken up. Further, by starting with larger pieces, one is able to later process the product to a number of desired particle size in a subsequent operation.

The cut bacon ends and pieces are then placed in a steam jacketed kettle and the temperature is brought to between 180° F. to 220° F. and preferably between 210° F. to 220° F. During this time, the cut bacon ends and pieces are cooking in their own fat. Once the cut bacon ends and pieces reach 210° to 220° F., the resulting bacon slurry is pumped to a steam jacketed vacuum and cooked under a vacuum kettle until the water activity level of the cut bacon is brought to a first level between 0.75 to 0.9, preferably between 0.8 to 0.9 and in a preferred embodiment between 0.82 to 0.85. It is understood that this may be done in just one kettle, but for production reasons, two kettles are used.

When at the first water activity level, the color of the bacon ends and pieces are a pink color. The bacon slurry is then pumped to a drain basket and fat, which has been obtained from cooking the bacon, is separated from the bacon end and pieces.

The bacon ends and pieces are then fed into a continuous oil fryer. Bacon fat at a temperature of between 290° F. to 300° F. is typically used in the continuous oil fryer. The bacon ends and pieces are in the continuous oil fryer until the desired second water activity level is achieved. This second water activity level is between 0.7 to 0.8 and preferably between 0.72 to 0.76. It is understood that the individual pieces may have some variation, but it is preferred that the average be in the above discussed ranges. The bacon ends and pieces are in the continuous fryer sufficient to achieve either this desired water activity level or until the desired color level is achieved. This typically is 30–50 seconds. The desired color at the second water activity level is a dark red color. Also, at the desired second water activity level the product has a better texture, that is being crisper and more brittle, but not too hard.

Oil is then pressed from the product using a suitable press such a hydraulic type of press, the bacon ends and pieces are then chilled by a suitable manner, well known in the art, such as a refrigerated air tunnel.

Then, the bacon ends and pieces are diced through a ⅜ inch dicing head or other suitable size (i.e. from ¼ inch to ⅜ inch) to bring the bacon ends and pieces to a second size, which is smaller than the first size. By further dicing the product, a final product that appears more like cooked sliced bacon that has been cut up or broken up is achieved. The bacon bits are then ready for further packaging by any suitable means well known in the art.

An example of the present invention is as follows. The bacon rework, or ends and pieces, off of a slicing line contains standard curing solutions such as cured with salt, sugar, dextrose, sodium, and erythorbate or sodium nitrite. As these are typical rework products, a variety of cured solutions may have been used. 2,600 lbs of bacon ends and pieces were cut on a Urschel Dicer using 1 inch circular blades and ⅛ inch cross-cut blades. This would typically give pieces between ½ to 1 inch square with ⅛ inch thickness. The bacon was added to a kettle and the temperature was brought to 220° F. The bacon slurry was then placed into a vacuum kettle at 19 to 21 inches Hg and cooked for 50 minutes. This brought the water activity level to 0.83 . The product was then fed into a continuous oil fryer at a setting of 290° F. with a dwell time of 48 seconds. The bacon fed into the fryer came out of the fryer at a water activity level of 0.73 to 0.76. The bacon was then chilled using an air tunnel.

The pieces were then further reduced in size by a ⅜ inch dicer setting. The product was then packed in glass jars.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A method for making bacon bits from bacon or bacon ends and pieces comprising the steps of:
    a) reducing the bacon or bacon ends and pieces to a first size;
    b) cooking the bacon or bacon ends and pieces to a time sufficient to bring a water activity level in the bacon or bacon ends and pieces to a first level, wherein the bacon or bacon ends and pieces after the cooking step have a pink color; and
    c) frying the bacon or bacon ends and pieces to bring the water activity level from the first level to a second level, wherein the bacon or bacon ends and pieces after the flying step have a dark red color.

2. The method of claim 1, further comprising separating fat, obtained from cooking the bacon, from the bacon before frying the bacon.

3. The method of claim 1, wherein frying the bacon is by a continuous oil fryer.

4. The method of claim 1, wherein the first level is from 0.75 to 0.9.

5. The method of claim 1, wherein the first level is from 0.8 to 0.9.

6. The method of claim 1, wherein the first level is from 0.82 to 0.85.

7. The method of claim 1, wherein the second level is from 0.7 to 0.8.

8. The method of claim 1, wherein the second level is from 0.72 to 0.76.

9. The method of claim 1, further comprising dicing the bacon or bacon ends and pieces after frying to a second size, the second size being smaller than the first size.

10. A method for making bacon bits from bacon ends and pieces, comprising the steps of:
    a) sizing the bacon ends and pieces to a first size;
    b) cooking the bacon ends and pieces to a time sufficient to bring a water activity level of the bacon ends and pieces to a first level, wherein the bacon ends and pieces after the cooking step have a pink color;
    c) separating fat, obtained from cooking the bacon ends and pieces, from the bacon ends and pieces;
    d) continuous frying the bacon ends and pieces to bring the water activity level of the bacon ends and pieces from the first level to a second level, wherein the bacon ends and pieces after the frying step have a dark red color; and
    e) sizing the bacon ends and pieces to a second size, the second size smaller than the first size.

11. The method of claim 10, wherein the first level is from 0.8 to 0.9 and the second level is from 0.7 to 0.8.

12. The method of claim 10, wherein the first level is from 0.82 to 0.85 and the second level is from 0.72 to 0.76.

13. The method of claim 10, further comprising removing oil from the bacon ends and pieces after continuous frying and chilling the bacon ends and pieces before sizing to the second size.

* * * * *